(12) United States Patent  
Shelton et al.

(10) Patent No.: US 10,162,051 B2  
(45) Date of Patent: Dec. 25, 2018

(54) USB/WIRELESS BASED TRAFFIC RADAR SYSTEM

(71) Applicant: Kustom Signals, Inc., Lenexa, KS (US)

(72) Inventors: Maurice E. Shelton, Buffalo, KS (US); Michael J. Bietsch, Nevada, MO (US); Kent F. Hayes, Olathe, KS (US)

(73) Assignee: Kustom Signals, Inc., Lenexa, KS (US)

( * ) Notice: Subject to any disclaimer, the term of this patent is extended or adjusted under 35 U.S.C. 154(b) by 778 days.

(21) Appl. No.: 14/657,758

(22) Filed: Mar. 13, 2015

(65) Prior Publication Data

US 2015/0260840 A1 Sep. 17, 2015

Related U.S. Application Data

(60) Provisional application No. 61/952,300, filed on Mar. 13, 2014.

(51) Int. Cl.
*G01S 13/91* (2006.01)
*G01S 7/04* (2006.01)
*G01S 13/58* (2006.01)

(52) U.S. Cl.
CPC .......... *G01S 13/91* (2013.01); *G01S 7/04* (2013.01); *G01S 13/589* (2013.01)

(58) Field of Classification Search
CPC .......... G01S 13/91; G01S 13/589; G01S 7/04; G01S 13/92; G01S 13/93; G01S 13/58–13/64
See application file for complete search history.

(56) References Cited

U.S. PATENT DOCUMENTS

| | | |
|---|---|---|
| 4,020,490 A | 4/1977 | Millard |
| 4,236,140 A | 11/1980 | Aker et al. |
| D261,735 S | 11/1981 | Sergent |
| 5,504,488 A | 4/1996 | Henderson et al. |
| 5,528,245 A | 6/1996 | Aker et al. |
| 5,528,246 A | 6/1996 | Henderson et al. |
| 5,530,446 A | 6/1996 | Filipek |
| 6,023,236 A | 2/2000 | Shelton |
| 6,088,752 A | 7/2000 | Ahern |
| 6,400,309 B1 | 6/2002 | Jones |
| 6,577,269 B2 | 6/2003 | Woodington et al. |
| 7,091,901 B2 | 8/2006 | Shelton et al. |
| 7,227,494 B2 | 6/2007 | Aker |
| 7,400,290 B2 | 7/2008 | Woodington et al. |
| 7,409,294 B2 | 8/2008 | Mead et al. |
| 7,672,782 B2 | 3/2010 | Mead et al. |
| 7,705,772 B1 * | 4/2010 | Shelton .............. G01S 7/354 342/104 |
| 7,821,422 B2 | 10/2010 | Hutchinson et al. |
| 7,864,102 B2 | 1/2011 | Aker |
| 8,138,966 B2 | 3/2012 | Aker |

(Continued)

*Primary Examiner* — Matthew M Barker
(74) *Attorney, Agent, or Firm* — Erickson Kernell IP, LLC

(57) ABSTRACT

A traffic radar system utilizes a standard USB interface of power and communication to a host USB device. Modules of the radar system communicate over a wireless network to reduce hard-wire cabling in the patrol vehicle or radar platform. Digital signal processing (DSP) is utilized in a distributed processing architecture to increase processing functionality and target detection capabilities. The system modules incorporate electrical and mechanical interfaces which allow modules to be connected together to form unique radar systems.

54 Claims, 6 Drawing Sheets

(56) References Cited

U.S. PATENT DOCUMENTS

| | | | |
|---|---|---|---|
| 8,378,884 B2 | 2/2013 | Aker | |
| 2005/0253749 A1* | 11/2005 | Shelton | G01S 13/92 342/104 |
| 2008/0001735 A1* | 1/2008 | Tran | G06F 19/3418 340/539.22 |
| 2010/0292568 A1* | 11/2010 | Droitcour | A61B 5/05 600/425 |
| 2012/0274503 A1* | 11/2012 | Hyde | G01S 7/412 342/175 |
| 2012/0306640 A1* | 12/2012 | Al-Harbi | G08G 1/042 340/539.11 |
| 2014/0362231 A1* | 12/2014 | Bietsch | G06T 7/20 348/169 |
| 2015/0260840 A1* | 9/2015 | Shelton | G01S 13/91 342/113 |

* cited by examiner

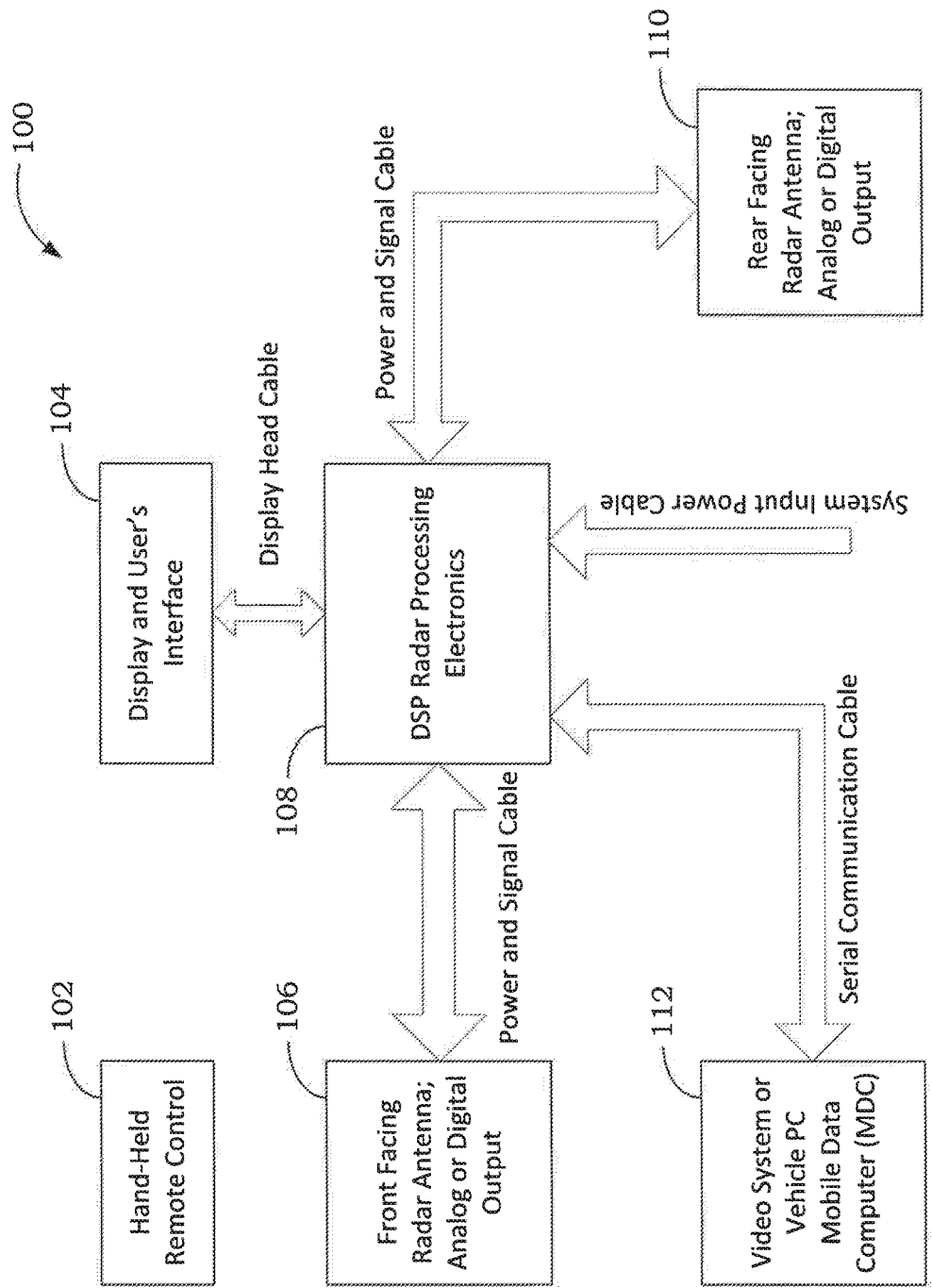
Fig. 1 – Prior Art Traffic Radar System

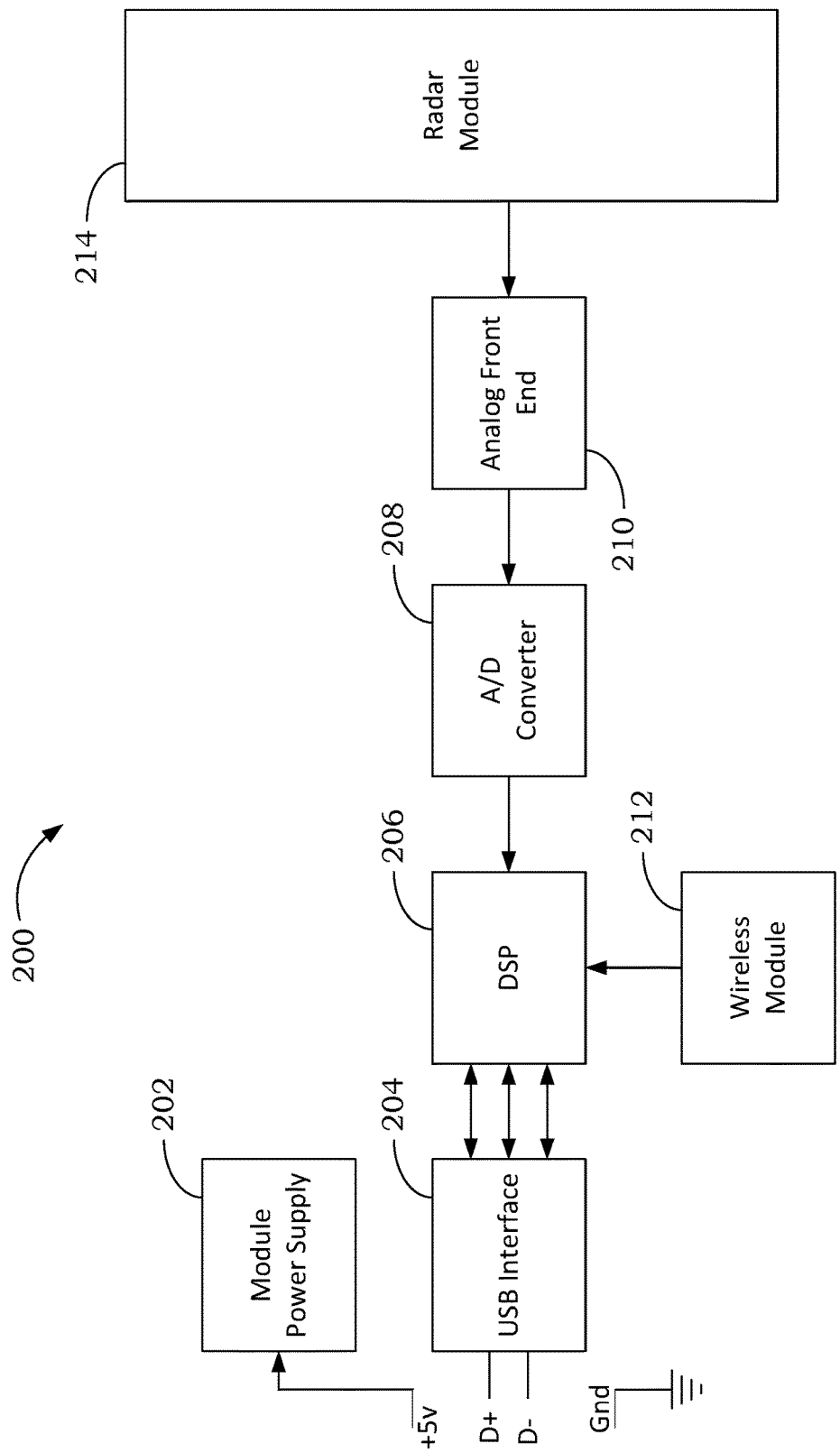
Fig. 2 – Radar Base Module (RBM)

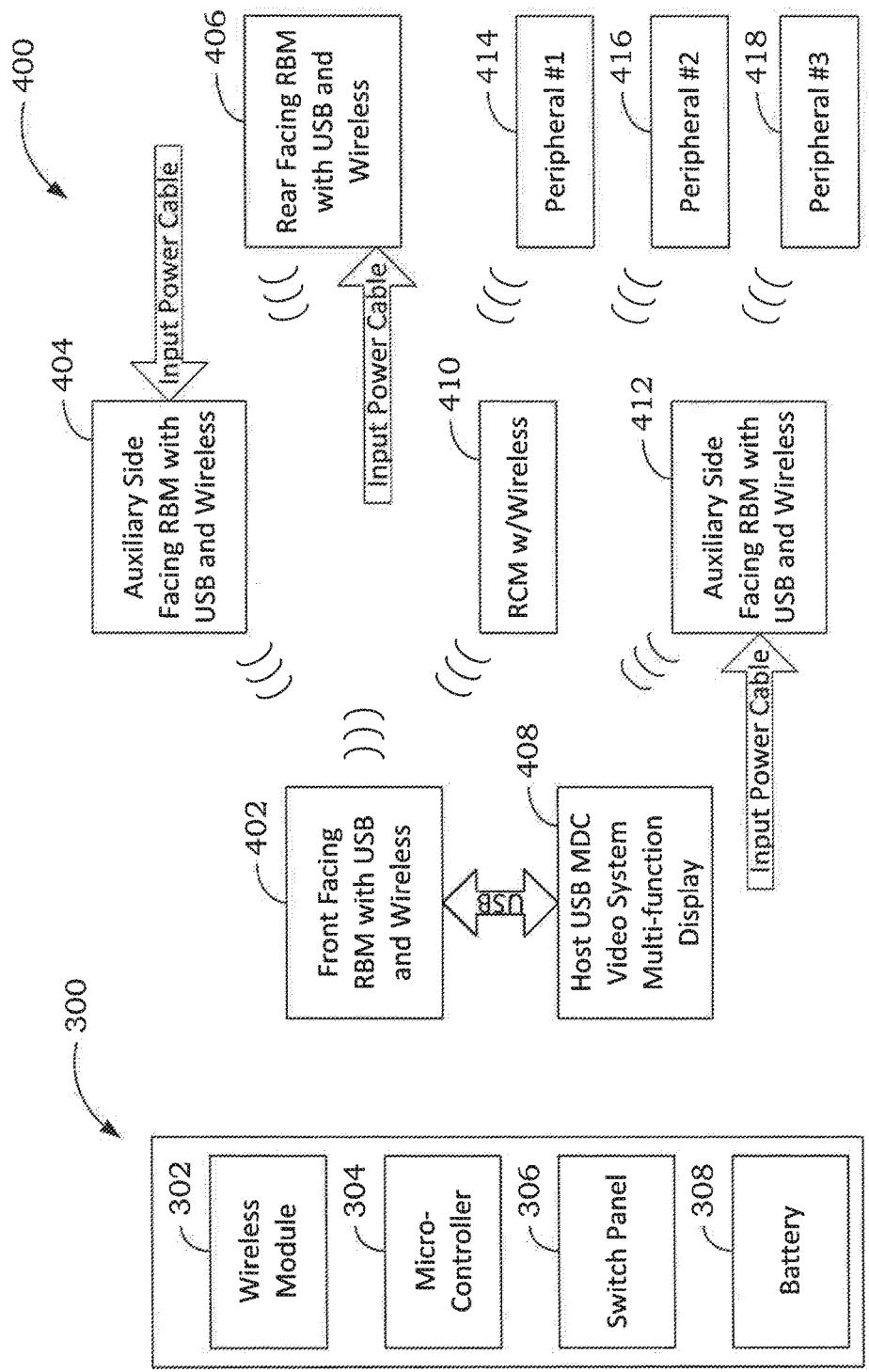
Fig. 4 – USB/Wireless Traffic Radar System
Fig. 3 – Remote Control Module (RCM)

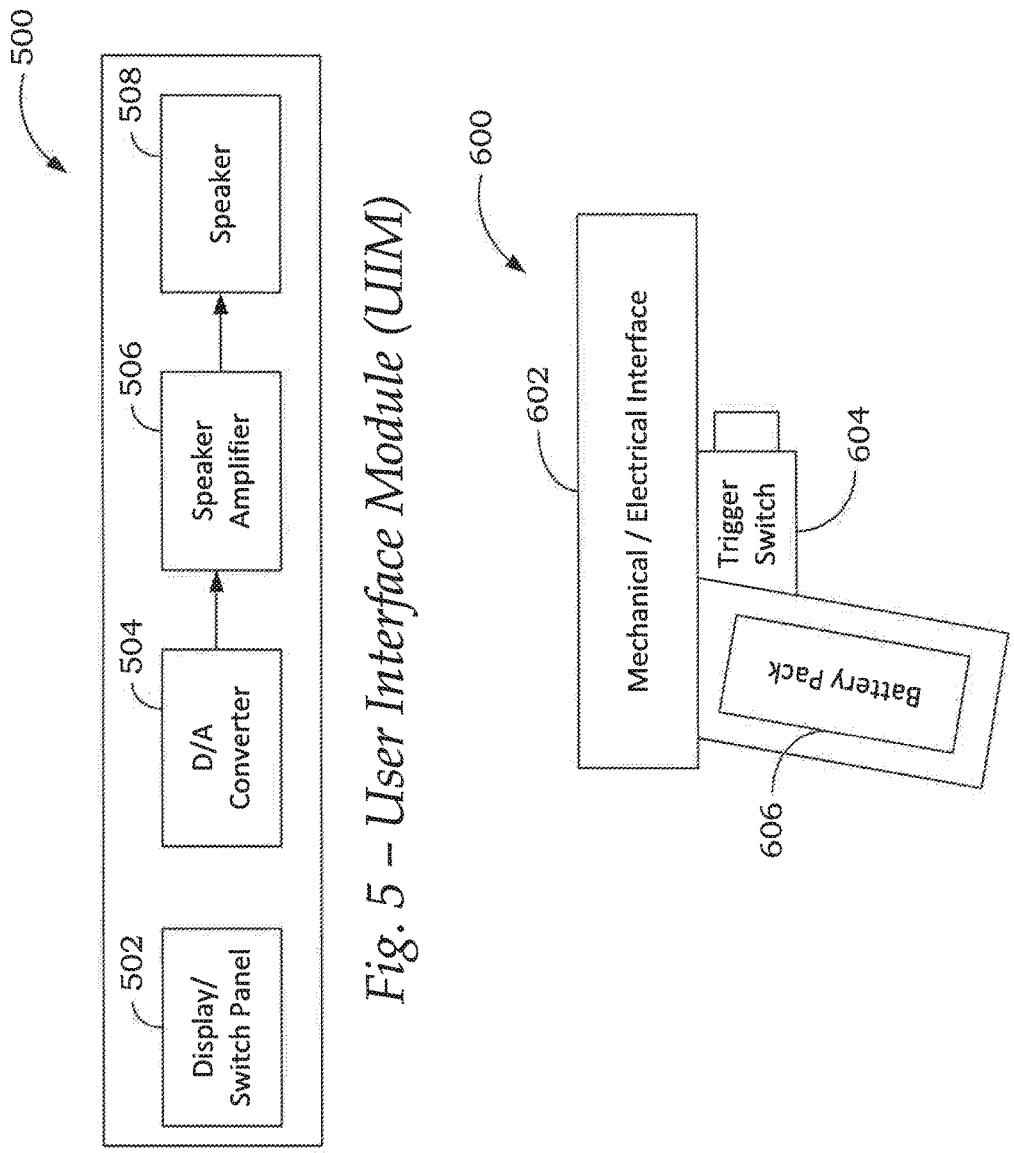

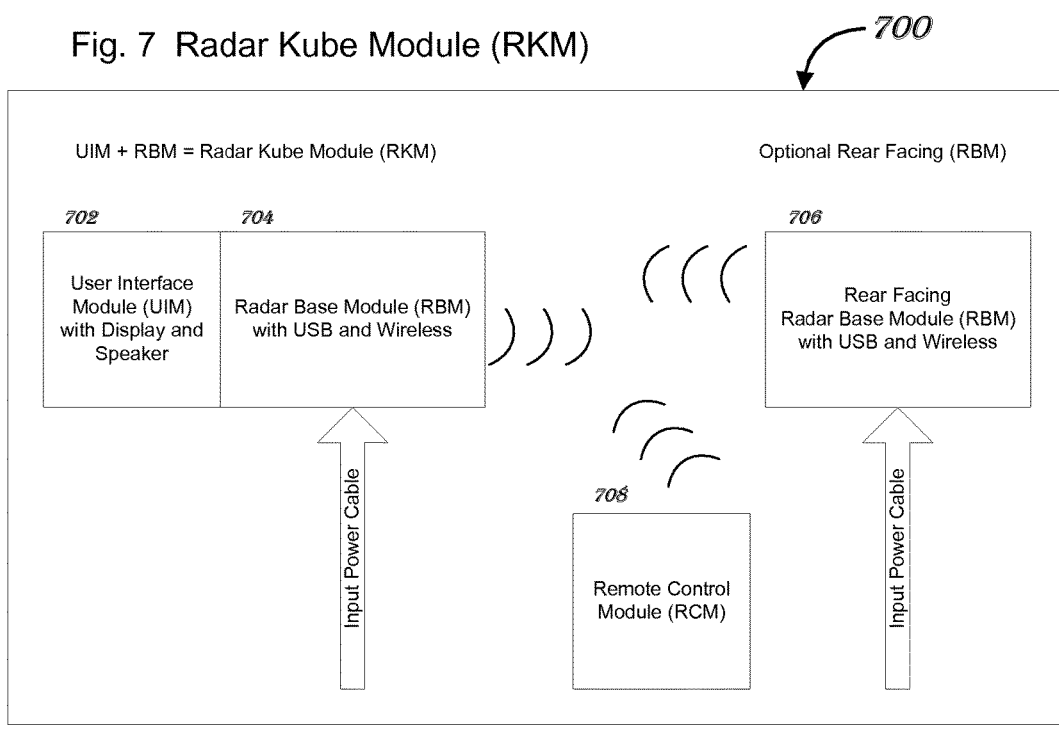
Fig. 7 Radar Kube Module (RKM)

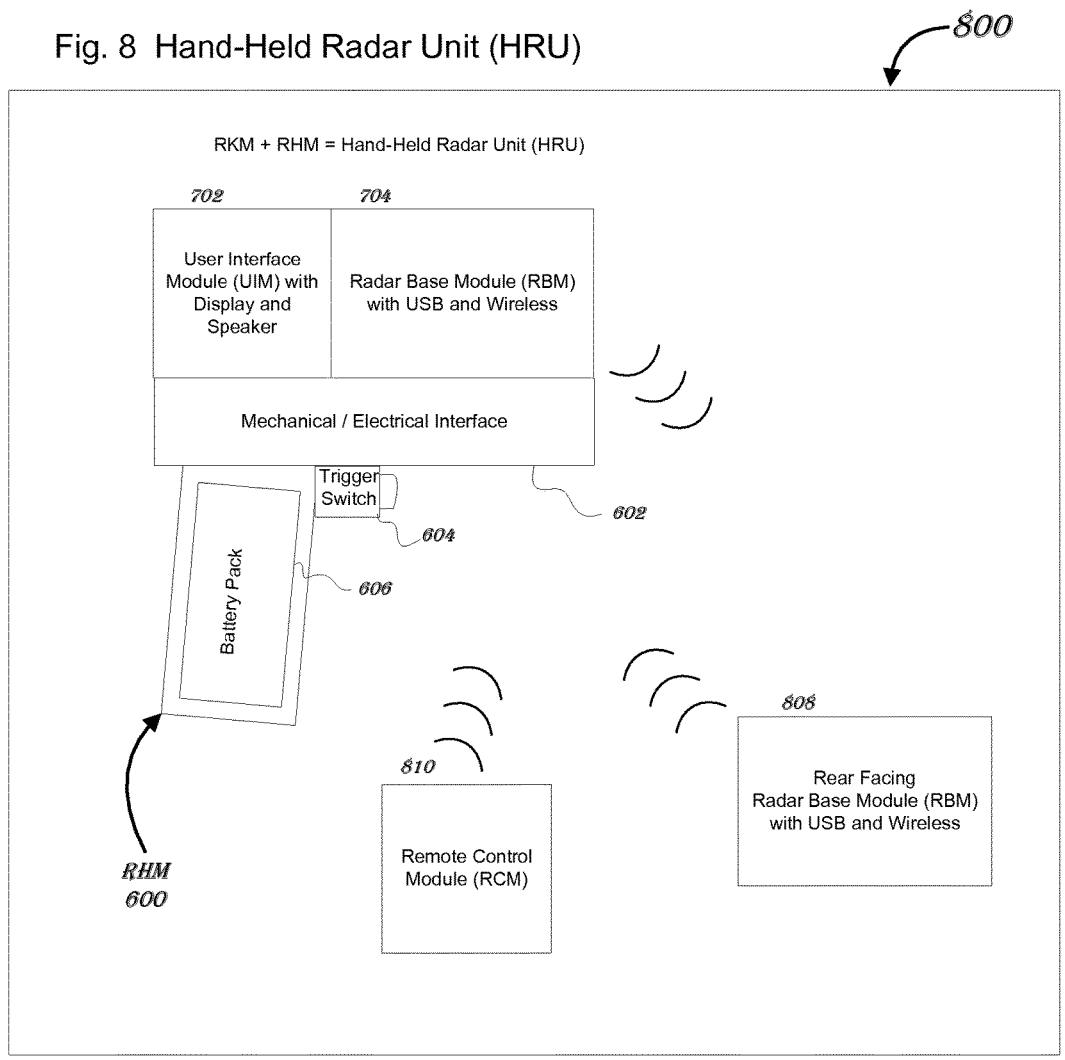

USB/WIRELESS BASED TRAFFIC RADAR SYSTEM

CROSS-REFERENCE TO RELATED APPLICATION

This application claims the benefit of provisional application Ser. No. 61/952,300, filed on Mar. 13, 2014, entitled USB/WIRELESS BASED TRAFFIC RADAR SYSTEM.

FIELD

The present invention relates to traffic radar systems for law enforcement and related applications, and more particularly to a traffic radar system in which a single system star point communicates and is powered from the industry standard Universal Serial Bus (USB). Other modules in the radar system communicate with the star point over a wireless network.

BACKGROUND

Traffic radar systems utilizing digital signal processing (DSP) have been in use for a number of years. Such a DSP radar system has traditionally been created with one or two radar antennas connected by wired cables to the radar processing box. A user's display box can be attached directly to the processing box or mounted remotely and connected by wired cable. A hand-held remote control unit can be connected by wired cable to the processing to allow the user some control of the system. The radar processing box can also be connected by a serial wired cable to the patrol vehicle's mobile data computer (MDT), video recording system, or other third party equipment. This allows for some system commands to be sent to the radar system and for radar speed data to be recorded and displayed.

It would be advantageous in traffic radar systems to allow the modules of the system to communicate wirelessly and for a single point or single module to be powered and communicate with the patrol vehicle MDT, video recording system, or third party computing device utilizing the industry standard Universal Serial Bus (USB). This design approach would dramatically reduce the number of hard-wired cables and increase the configuration flexibility of the radar system.

Another improvement of the invention in traffic radar systems would be for each radar antenna to have independent or distributed processing. This would allow greater capabilities to process targets in multiple directions from the radar platform.

Another desired improvement in such systems would be to allow the modules to be configured together in ways to create different product offerings. Capabilities of an improved system would include creating mechanical interfaces that allow mounting the modules in the vehicle or interconnecting modules into stand-alone products.

SUMMARY

In an embodiment of the present invention, the aforesaid may be addressed by providing a Radar Base Module (RBM) utilizing digital signal processing (DSP) to determine target information based on the returning radar echo signals. The RBM may be powered and communicate over a standard communication bus such as Ethernet or Universal Serial Bus (USB). In the following description of the preferred invention, the RBM is described powered and communicating via a standard USB connection. The USB may be connected to the patrol vehicle's Mobile Data Computer or any host USB device. Application software may run on the host USB device to allow configuring the mode of operation of the radar system and the information of the radar targets to be displayed to the operator. The RBM connected to the host USB device is referred to as the star RBM.

In another aspect of the invention, multiple additional RBM modules may be added to the radar system. These additional RBM modules may each contain their own DSP processing capabilities and communicate with the star RBM over a wireless network. This distributed processing approach increases the processing capabilities over the traditional traffic radar system. The host application software may configure the mode of operation of the individual RBM modules, put certain modules to sleep, or have RBM modules processing radar signals simultaneously, for example.

Additional peripheral devices such as a hand-held remote control, auxiliary displays, hard-copy printers, GPS, and vehicle information sensors may be added to the wireless network.

The modules of the radar system may have a mechanical interface that allows for mounting the modules in the patrol vehicle and connects the modules together to create unique product offerings.

Other advantages of this invention will become apparent from the following description taken in connection with the accompanying drawings, wherein is set forth by way of illustration and example, an embodiment of the present invention.

BRIEF DESCRIPTION OF THE DRAWINGS

FIG. 1 is a block diagram of a traditional traffic radar system.

FIG. 2 is a block diagram a Radar Base Module (RBM) of the present invention.

FIG. 3 is a block diagram of a hand-held Remote Control Module (RCM).

FIG. 4 is a simplified diagram of a USB/Wireless Traffic Radar System.

FIG. 5 is a block diagram of a User Interface Module (UIM).

FIG. 6 is a block diagram of a Radar Handle Module (RHM).

FIG. 7 is a simplified system diagram of a Radar Kube Module (RKM).

FIG. 8 is a simplified system diagram of a Hand-held Radar Unit (HRU).

DETAILED DESCRIPTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Turning more particularly to the drawings, FIG. 1 depicts a block diagram of a prior art traffic radar system indicated by reference numeral 100. Examples of these types systems are the Kustom Signals, Inc. (KSI) Eagle and Raptor traffic radar systems (see U.S. Pat. Nos. 5,528,246 and 7,705,772). System 100 contains a single Digital Signal Processor (DSP 108) which processes all radar echo signal returns. Block 106 is the front facing radar antenna and Block 110 is the optional rear facing radar antenna. These antennas 106 and 110 pass the returning radar echo signals to the DSP 108 for processing by way of a hard-wired cable. The signal data can be in analog or digital form. In the typical system 100 only one antenna at a time is passing signals to the DSP 108 for processing. Once the DSP 108 has processed the signals and converted the data into target speed and direction information, it is sent to the user's display 104. A hand-held remote control 102 allows the user to control which antenna is in use and the mode of operation. The DSP 108 provides an output in serial in RS232 format, for example, that allows connection to a third party device 112 such as an in-car video system or a mobile data computer, for example.

In the preferred embodiment, the radar antenna and DSP processing along with a USB interface and wireless transceiver are combined into a single Radar Base Module (RBM) 200. FIG. 2 depicts the simplified block diagram of the RBM 200. Radar Transceiver 214 contains the microwave source generator, microwave receiver section, and the radar antennas. The receiver section employs mixer circuitry that mixes a sample of the transmit frequency with the returning Doppler shifted echo signals. In a preferred embodiment of a directional radar system, this is a dual channel I/Q mixer. An example of this type of Radar Transceiver 214 is the Singapore Technologies Electronic model DF 300-0, K-Band Doppler RF transceiver module. The resulting Doppler output signals from the mixer are amplified and filtered by an Analog Front End section 210. The amplification may be fixed, automatic, or programmable gain. An example of a programmable gain circuit that may be use is the LTC6911-1 dual matched programmable amplifiers from Linear Technologies.

A high precision Analog-to-Digital converter 208 converts the analog Doppler signals into a time domain digital format. Desired features for the Analog-to-Digital converter 208 are Delta Sigma architecture, 24 bit resolution, and high signal to noise ratio. An example of this type of converter is the PCM1803A from Texas Instruments. A DSP processor 206 is connected to the Analog-to-Digital converter 208 by a conventional high-speed serial interface. Large blocks of the signal data are gathered for the DSP radar processing. For example, in the preferred embodiment, 1024 time domain samples for each of the I and Q signal channels are gathered and stored for each processing session. The DSP 206 will transform the time-domain data into the frequency domain for further target detection, speed conversion, and target direction determination processing. Desired features for DSP 206 are single cycle DSP instructions, large internal memory blocks, low-power operation, and built-in serial communication modules. An example of this type DSP is the TMS320F28069PZ from Texas Instruments.

The DSP 206 is connected to a wireless transceiver 212. The desired features which the wireless transceiver 212 may have are low power and high sensitivity, and be certified for world-wide use. An example of the transceiver 212 may be the JN5148-001-MOO from NXP semiconductors. This allows the RBM 200 to communicate with other devices in the radar system without hardware cabling. An industry standard RF network such as BlueTooth or Zigbee or a proprietary RF network such as SNAP from Synapse Wireless Inc. or JenNet from NXP semiconductors may be used. The communication can be point-to-point, mesh, star, or other type of wireless network configuration. In the current embodiment the devices of the network communicate through the star RBM 200.

The DSP 206 is connected to a USB interface circuitry 204. The USB interface 204 may be built into the DSP chip or may be an USB protocol convertor such as the MCP2200 from Microchip Technology Inc. The USB interface block 204 allows the DSP 206 to communicate with and receive power from an external host USB device (not shown). An example of the USB host device is the patrol vehicle's Mobile Data Computer (MDC). If the RBM 200 is contacted by the application software running on the host USB device, the RBM 200 will be configured as the star RBM. The host USB device also supplies power to the RBM 200. The USB standard for the output power over the USB interface is +5 VDC at up to 500 milliamps, for example. Power from the host USB device is supplied to a power supply module 202. The power supply 202 converts the input power (5 volts, for example) to the needed voltages which are delivered to the other circuitry of the RBMU 200. Alternatively, the RBM 200 can receive power only through the USB interface 204. An example of this would be a vehicle to USB power adapter. Since there is no communication over the power only USB connection, the RBM 200 may communicate with the host USB via the wireless network and star RBM.

FIG. 3 depicts the simplified block diagram of the hand-held Remote Control Module RCM 300 which gives the operator control over some of the systems functions. A general purpose microcontroller 304 such as one from the PIC 24F family supplied by Microchip Technology Inc. reads the switch presses from a switch panel 306 and sends the data to a wireless transceiver 302. A battery 308 supplies power for the RCM 300.

In a typical traditional state of the art traffic radar system as depicted in FIG. 1 the radar signal and user's display information processing is done via a central DSP processing box. In the preferred embodiment of the present invention, the radar processing tasks are distributed to each Radar Base Module RBM 200 (FIG. 2) and an application software program running on the host USB device displays the user's information. With each RBM 200 containing its own processing and wireless communications abilities, several radar modules may process target signals simultaneously and this data may be sent to the host USB device. Since these display devices have higher resolution and greater graphical capabilities over the traditional traffic radar display, much more information may be presented to the user.

FIG. 4 illustrates a simplified block diagram of a USB/Wireless Traffic Radar System 400. This system may be operating from a moving platform as in a police or military vehicle, or it may be operating in a fixed platform location. One of the RBM modules 402 may be connected to a host USB device 408. This host 408 may be a mobile data computer (MDC), in-vehicle video system, or a custom multi-functional display for example. Since this RBM 402 is connected to the host USB device it may be designated as the star point of the wireless network. In this example, RBM 402 may be the front or forward facing radar module detecting and processing the speed and direction of travel of the targets in front of the system platform.

Block 406 in this example is the rear facing radar base module (RBM). Since it is receiving power only (no data) through its USB interface, it communicates with the host USB display 408 by wireless communication to the star RBM 402. Rear facing RBM 406 detects and processes the speed and direction of travel of the targets behind the system platform.

Blocks 404 and 412 depict additional RBM units. In this example, these units may be facing to the sides of the platform. Since the units are receiving power only, no data, through their USB interface they may communicate to the host USB display 408 by wireless communication to the star RBM 402. Side facing RBM units 404 and 412 detect and process the speed and direction of travel of the targets to the sides of the system platform.

The host USB display device 408 may include the vehicle's Mobile Data Computer (MDC), the in-vehicle video system, vehicle integration system, and custom multi-function display for example. An application program running on MDC 408 allows it to control and display information from the other RBM devices on the network. An example of this would be that the user could select to display only targets in front of the platform that are traveling toward the platform. The star RBM 402 is sent the configuration from the MDC 408 via USB and it in turn relays the instructions wirelessly to the other RBM devices on the network. In this example the front RBM 402 turns on its radar transmission and reports any targets traveling toward the platform. The other RBM devices 402, 404, 406 and 412 would not transmit a radar signal and would not send any target data on the network.

In another example of the host USB device 408 controlling the system, the user could select to display targets from all four RBM devices 402, 404, 406 and 412 around the platform that are approaching or receding from the platform. The star RBM 402 is sent the configuration from the host 408 via USB, and it in turn relays the instructions wirelessly to the other RBM devices on the network. In this example the RBM devices would send their target information to the star RBM 402 and the star RBM 402 would report this data along with its own target data to the host USB device for display.

In the example of FIG. 4 there are four RBM devices 402, 404, 406 and 412 in the system, but since in this invention the radar processing has been distributed to each RBM device there is no bottleneck of processing by adding modules. The number of Radar Base Modules allowed in the system is only restricted by the capabilities of the wireless network. In this embodiment, the maximum number of RBM devices has been set to 250 units, for example.

Block 410 shows a hand-held Remote Control Module (RCM). The main users' interface and system configuration utilities are initiated through the host USB device 408, but the RCM 410 allows the user to have control of the system. Examples of these type controls would be to lock the current target display readings or hold the radar transmission. The RCM 410 would transmit to the star RBM 402. The star RBM 402 would acknowledge the message and carry out the control or pass it to the appropriate network device.

Blocks 414, 416, and 418 depict additional peripheral devices that may be added to the wireless network. Examples of these types of devices are auxiliary target displays, GPS modules, printers, sensors, etc. Each of these devices has the ability to communicate with the star RBM 402. The peripheral devices allow data from sensors such as GPS location and velocity, vehicle data, etc. to be communicated to the radar system without adding hard-wire cabling. Also the radar system can communicate radar operational and target data such as mode of operation, target speed, target direction of travel and target distance to the peripheral devices without adding hard-wired cabling.

Furthermore, additional modules are designed to allow the radar system to be expanded by connecting these modules to a Radar Base Module (RBM) with a mechanical interface. This mechanical interface will also provide the means of connecting the modules together to create a variety of systems tailored to the user's requirements. FIG. 5 depicts a User Interface Module (UIM 500). A display 502 for displaying operational and target related data also contains some user controls for operations of the radar system. Desirable features for the display may be a color display which is sunlight readable. An example of this type display is model T-55149GD030J-MLW-ALN from Optrex Corporation. An optional Digital-to-Analog converter 504 converts Doppler audio to analog form which is output to an audio power amplifier 506 and is amplified and impedance matched to a speaker 508 by the speaker driver-circuit of amplifier 506. An example of an audio power amplifier which may be used for this application is the TPA2005D1 from Texas Instruments.

FIG. 6 depicts the Radar Handle Module (RHM 600). An electrical and mechanical interface 602 outputs to a trigger switch 604, which allows the user to fire the radar transmission. The handle contains a battery power supply 606.

FIG. 7 shows an example of how the system modules may be connected together to form a new product offering. To create a very basic functional traffic radar product, a User Interface Module (UIM) 702 may be connected to a Radar Base Module (RBM) 704 to form a fully functioning Radar Kube Module (RKM) 700, [(UIM)+(RBM)=(RKM)]. The RKM 700 is capable of moving or stationary operation and may display patrol and target data from the platform depending on the direction the user has the RBM 704 aimed. Additional RBM units 706 may be added to the system. The additional RBMs 706 communicate wirelessly with the RKM 700 for control and to display data. A Remote Control Module (RCM) 708 may also be added for convenient user system controls.

FIG. 8 depicts yet another example of the modules' connectability. As described above, a UIM 702 is connected to an RBM block 704 to create the RKM 700 (FIG. 7). The RKM 700 is connected to the RHM 606 battery pack (FIG. 6) to create a complete fully functioning Hand-Held Radar Unit (HRU 800, FIG. 8). The HRU 800 is powered from the internal battery pack 606 and the user controls the radar transmission by the trigger switch 604 on the handle. Even this product functionality may be expanded by additional RBM devices, block 808, communicating wirelessly to the HRU 800 to display more target information to the user. A Radar Control Module (RCM) 810 may also be added to allow the user additional controls for the system.

It is to be understood that while certain now preferred forms of this invention have been illustrated and described, it is not limited thereto except insofar as such limitations are included in the following claims.

Having thus described the invention, what is claimed as new and desired to be secured by Letters Patent is as follows:

1. A wireless traffic radar system comprising:
   a radar base module (RBM) having a radar transceiver, an analog front end coupled to said radar transceiver to receive Doppler signals therefrom, an analog-to-digital converter coupled to said analog front end to receive analog signals therefrom and convert said analog signals to a time domain digital data format, a processor coupled to said analog-to-digital converter to receive said time domain digital data therefrom and transform said time domain digital data to frequency domain digital data, a wireless transceiver coupled to said processor for receiving digital data therefrom and communicating with other wireless transceivers of a wireless network, a USB interface coupled to said processor and providing power thereto, and a host USB device coupled to said USB interface of said RBM.

2. The wireless traffic radar system of claim 1 wherein said radar transceiver includes a microwave source generator, a microwave receiver and a radar antenna.

3. The wireless traffic radar system of claim 2 wherein said microwave receiver includes mixer circuitry to mix a sample of a signal transmitted by said microwave source generator from said radar antenna with a signal received by said radar antenna and output said Doppler output signals.

4. The wireless traffic radar system of claim 1 wherein said analog front end amplifies and filters said Doppler signals received from said radar transceiver.

5. The wireless traffic radar system of claim 4 wherein said amplification is a fixed gain.

6. The wireless traffic radar system of claim 4 wherein said amplification is an automatic gain.

7. The wireless traffic radar system of claim 4 wherein said amplification is a programmable gain.

8. The wireless traffic radar system of claim 1 wherein said analog-to-digital converter includes a delta sigma architecture.

9. The wireless traffic radar system of claim 1 wherein said analog-to-digital converter has a 24 bit resolution.

10. The wireless traffic radar system of claim 1 wherein said processor is a digital signal processor (DSP).

11. The wireless traffic radar system of claim 10 wherein said DSP processes said frequency domain data for target detection, target speed determination, and target direction determination.

12. The wireless traffic radar system of claim 1 wherein said wireless transceiver utilizes a BlueTooth protocol to communicate with said other wireless transceivers.

13. The wireless traffic radar system of claim 1 wherein said wireless transceiver utilizes a Zigbee protocol to communicate with said other wireless transceivers.

14. The wireless traffic radar system of claim 1 wherein said wireless transceiver utilizes a SNAP protocol to communicate with said other wireless transceivers.

15. The wireless traffic radar system of claim 1 wherein said wireless transceiver utilizes a JenNet protocol to communicate with said other wireless transceivers.

16. The wireless traffic radar system of claim 1 wherein said host USB device is a mobile data computer.

17. The wireless traffic radar system of claim 1 wherein said host USB device is an in-vehicle video system.

18. The wireless traffic radar system of claim 1 wherein said host USB device is a multi-function display.

19. The wireless traffic radar system of claim 1 wherein said RBM is a star point of said wireless network.

20. The wireless traffic radar system of claim 1 wherein said wireless network is a mesh wireless network.

21. The wireless traffic radar system of claim 1 wherein said wireless network is a point-to-point wireless network.

22. The wireless traffic radar system of claim 1 wherein said RBM is a front facing RBM.

23. The wireless traffic radar system of claim 1 further comprising a rear facing RBM wirelessly coupled to said RBM.

24. The wireless traffic radar system of claim 1 further comprising a plurality of RBMs wirelessly coupled to said RBM.

25. The wireless traffic radar system of claim 24 wherein said RBM is a forward facing RBM, and said plurality of RBMs include a rear facing RBM and a side facing RBM.

26. The wireless traffic radar system of claim 1 further comprising a remote control module wirelessly coupled to said RBM for user control of said host USB device.

27. The wireless traffic radar system of claim 1 further comprising a peripheral device wirelessly coupled to said RBM.

28. The wireless traffic radar system of claim 27 wherein said peripheral device is a GPS module.

29. The wireless traffic radar system of claim 27 wherein said peripheral device is a printer.

30. A wireless traffic radar system comprising:

a radar base module (RBM) having a radar transceiver, an analog front end coupled to said radar transceiver to receive Doppler signals therefrom, an analog-to-digital converter coupled to said analog front end to receive analog signals therefrom and convert said analog signals to a time domain digital data format, a processor coupled to said analog-to-digital converter to receive said time domain digital data therefrom and transform said time domain digital data to frequency domain digital data, a wireless transceiver coupled to said processor for receiving digital data therefrom and communicating with other wireless transceivers of a wireless network, a USB interface coupled to said processor and providing power thereto, a user interface module (UIM) having a multi-function display and coupled to said RBM, said RBM and UIM mounted to a mechanical interface, a trigger mounted so said mechanical interface and coupled to said RBM for selectively activating said radar transceiver, and a battery mounted to said mechanical interface coupled to said RBM and UIM providing power thereto.

31. The wireless traffic radar system of claim 30 wherein said radar transceiver includes a microwave source generator, a microwave receiver and a radar antenna.

32. The wireless traffic radar system of claim 31 wherein said microwave receiver includes mixer circuitry to mix a sample of a signal transmitted by said microwave source generator from said radar antenna with a signal received by said radar antenna and output said Doppler output signals.

33. The wireless traffic radar system of claim 30 wherein said analog front end amplifies and filters said Doppler signals received from said radar transceiver.

34. The wireless traffic radar system of claim 33 wherein said amplification is a fixed gain.

35. The wireless traffic radar system of claim 33 wherein said amplification is an automatic gain.

36. The wireless traffic radar system of claim 33 wherein said amplification is a programmable gain.

37. The wireless traffic radar system of claim 30 wherein said analog-to-digital converter includes a delta sigma architecture.

38. The wireless traffic radar system of claim 30 wherein said analog-to-digital converter has a 24 bit resolution.

39. The wireless traffic radar system of claim 30 wherein said processor is a digital signal processor (DSP).

40. The wireless traffic radar system of claim 39 wherein said DSP processes said frequency domain data for target detection, target speed determination, and target direction determination.

41. The wireless traffic radar system of claim 30 wherein said wireless transceiver utilizes a BlueTooth protocol to communicate with said other wireless transceivers.

42. The wireless traffic radar system of claim 30 wherein said wireless transceiver utilizes a Zigbee protocol to communicate with said other wireless transceivers.

43. The wireless traffic radar system of claim 30 wherein said wireless transceiver utilizes a SNAP protocol to communicate with said other wireless transceivers.

44. The wireless traffic radar system of claim 30 wherein said wireless transceiver utilizes a JenNet protocol to communicate with said other wireless transceivers.

45. The wireless traffic radar system of claim 30 wherein said RBM is a star point of said wireless network.

46. The wireless traffic radar system of claim 30 wherein said wireless network is a mesh wireless network.

47. The wireless traffic radar system of claim 30 wherein said wireless network is a point-to-point wireless network.

48. The wireless traffic radar system of claim 30 further comprising a rear facing RBM wirelessly coupled to said RBM.

49. The wireless traffic radar system of claim 30 further comprising a plurality of RBMs wirelessly coupled to said RBM.

50. The wireless traffic radar system of claim 49 wherein said plurality of RBMs include a rear facing RBM and a side facing RBM.

51. The wireless traffic radar system of claim 30 further comprising a remote control module wirelessly coupled to said RBM for user control of said UIM.

52. The wireless traffic radar system of claim 30 further comprising a peripheral device wirelessly coupled to said RBM.

53. The wireless traffic radar system of claim 52 wherein said peripheral device is a GPS module.

54. The wireless traffic radar system of claim 52 wherein said peripheral device is a printer.

* * * * *